United States Patent
Cai et al.

(10) Patent No.: US 11,190,432 B2
(45) Date of Patent: Nov. 30, 2021

(54) METHOD AND FIRST NODE FOR MANAGING TRANSMISSION OF PROBE MESSAGES

(71) Applicant: Telefonaktiebolaget LM Ericsson (publ), Stockholm (SE)

(72) Inventors: Xuejun Cai, Täby (SE); Mina Sedaghat, Solna (SE); Wolfgang John, Haninge (SE); Joacim Halén, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/971,066

(22) PCT Filed: Feb. 23, 2018

(86) PCT No.: PCT/SE2018/050176
§ 371 (c)(1),
(2) Date: Aug. 19, 2020

(87) PCT Pub. No.: WO2019/164428
PCT Pub. Date: Aug. 29, 2019

(65) Prior Publication Data
US 2021/0014145 A1 Jan. 14, 2021

(51) Int. Cl.
*H04L 29/08* (2006.01)
*H04L 12/26* (2006.01)
(Continued)

(52) U.S. Cl.
CPC .......... *H04L 43/10* (2013.01); *H04L 41/0677* (2013.01); *H04L 41/0893* (2013.01);
(Continued)

(58) Field of Classification Search
CPC ... H04L 67/10; H04L 67/104; H04L 67/1044; H04L 67/1046; H04L 67/1048;
(Continued)

(56) References Cited

U.S. PATENT DOCUMENTS 7,165,192 B1    1/2007 Cadieux et al.
2005/0075084 A1*  4/2005 Salokannel ....... H04W 52/0219
                                                        455/126

(Continued)

FOREIGN PATENT DOCUMENTS

WO    2011042035 A1    4/2011

OTHER PUBLICATIONS

Das, A., et al., "SWIM: Scalable Weakly-consistent Infection-Style Process Group Membership Protocol," International Conference on Dependable Systems and Networks, IEEE, Jun. 2002, 10 pages.
(Continued)

*Primary Examiner* — Tom Y Chang
(74) *Attorney, Agent, or Firm* — Withrow & Terranova, PLLC (57) ABSTRACT

A method and a first node for managing transmission of at least one probe message for detection of failure of a second node are disclosed. A network comprises the first and second nodes. The first node receives a message about an event related to the second node. The message comprises an identifier of the second node and an event type of the event. The first node retrieves at least one policy for failure detection based on the event type. The first node modifies a probe list based on said at least one policy with respect to the second node. The probe list indicates an order in which nodes, neighbouring to the first node, are to be probed by transmission of the probe messages thereto. The second
(Continued)

node is one of the nodes neighbouring to the first node. The first node transmits the probe messages according to the probe list.

11 Claims, 3 Drawing Sheets

(51) Int. Cl.
*H04L 12/24* (2006.01)
*H04W 84/20* (2009.01)

(52) U.S. Cl.
CPC ...... *H04L 43/0811* (2013.01); *H04L 67/1044* (2013.01); *H04L 67/1048* (2013.01); *H04L 67/1051* (2013.01); *H04L 67/1061* (2013.01); *H04W 84/20* (2013.01)

(58) Field of Classification Search
CPC ..... H04L 67/1068; H04L 43/10; H04L 43/12; H04L 67/1061; H04W 84/20; H04W 8/005
See application file for complete search history.

(56) References Cited

U.S. PATENT DOCUMENTS

| | | | |
|---|---|---|---|
| 2005/0240666 A1* | 10/2005 | Xu | H04L 12/403 709/223 |
| 2010/0145479 A1* | 6/2010 | Griffiths | G01D 21/00 700/17 |
| 2011/0161421 A1* | 6/2011 | Lowery | H04L 67/1068 709/204 |
| 2018/0150316 A1* | 5/2018 | Oh | G06F 9/485 |

OTHER PUBLICATIONS

International Search Report and Written Opinion for International Patent Application No. PCT/SE2018/050176, dated Nov. 13, 2018, 8 pages.

* cited by examiner

METHOD AND FIRST NODE FOR MANAGING TRANSMISSION OF PROBE MESSAGES

This application is a 35 U.S.C. § 371 national phase filing of International Application No. PCT/SE2018/050176, filed Feb. 23, 2018, the disclosure of which is incorporated herein by reference in its entirety.

TECHNICAL FIELD

Embodiments herein relate to failure detection in a node of a network, such as a computer network, a communication network, a core network of a mobile communication system or the like. In particular, a method and a first node for managing transmission of at least one probe message for detection of failure of a second node are disclosed. A corresponding computer program and a computer program carrier are also disclosed.

BACKGROUND

In order to make failure detection less dependent on a single node, distributed failure detection systems have been proposed. In this manner, the failure detection system avoids, at least to some extent, the problem of having a Single Point of Failure (SPF). Distributed failure detection systems are further well suited for other distributed systems, like cloud infrastructure, grid computing peer-to-peer systems and the like. In these kinds of systems, the distributed detection system is used to monitor a health status of each node and to detect potential failure of each node. In order to ensure consistency and to provide reliable applications/services on top of e.g. the cloud infrastructure, it is vital to have a good failure detection system that can fulfill requirements like high accuracy, high reliability, lightweight as in requiring a small amount of computational and/or memory resource for its operation and short detection time.

In general, failure detection is performed by exchange of so called keep-alive messages between the nodes in a distributed system. There are two types of keep-alive messages: heartbeat messages and polling messages.

A heartbeat message is sent, with a certain periodicity, from a monitored node to a failure detecting node in order to inform the detecting node about that the monitored node is still alive. The periodicity is known to both the monitored node and the failure detecting node. If the heartbeat message does not arrive at the failure detecting node according the periodicity, the failure detecting node suspects that the monitored node is faulty, or has failed.

A polling message is sent from the failure detecting node to the monitored node. If no reply to the polling message is received, by the failure detecting node, before a timeout expires, the failure detecting node suspects that the monitored node is faulty. The polling message can be exemplified by an ICMP Ping message.

In for example a cloud infrastructure, network connectivity is thought of as an unreliable resource. In the cloud infrastructure, it is therefore difficult to distinguish if a monitored node failed or if the keep-alive message was lost due to failure in the network connectivity, such as a network congestion. Therefore, so called in-direct probing has been introduced. With in-direct probing, it is intended to reduce false detection rates caused by e.g. network congestion or the like.

In a known distributed failure detection system, described in "SWIM: Scalable Weakly-consistent Infection-Style Process Group Membership Protocol", by A. Das, I. Gupta, and A. Motivala, published in in Proceedings of the 2002 International Conference on Dependable Systems and Networks, 2002, pp. 303-312, transmission of keep alive messages is typically performed at pre-defined and fixed time intervals. To avoid an introduction of too much overhead in the network, nodes usually don't send probe message to all other neighbors at every interval. For example, in SWIM the node picks only one neighbor, in a random manner, to send a probe message to in each interval.

In order to carefully select the pre-defined and fixed time interval, both overhead and detection time must be taken into account. One cannot have both a short detection time and a low overhead at the same time. Most existing failure detection systems consider this and choose a well-defined time interval for the system. However, in many scenarios it may be difficult to find a suitable time interval.

U.S. Pat. No. 7,165,192 discloses a method of probing nodes in a network to determine if one or more nodes are experiencing any events indicative of a fault. The nodes are probed in a predetermined sequence. In response to receiving a first alert transmitted by a first node in the network, one or more neighbor nodes of the first node are probed. By probing the first node and/or the neighbor nodes in response to receiving the alert from the first node, the monitor system may detect the possibly-related events and may correlate the events to a so called root cause.

SUMMARY

An object may be to improve a distributed failure detection system of the above mentioned kind.

According to an aspect, the object is achieved by a method, performed by a first node, for managing transmission of at least one probe message for detection of failure of a second node. A network comprises the first and second nodes. The first node receives a message about an event related to the second node. The message comprises an identifier of the second node and an event type of the event. The first node retrieves at least one policy for failure detection based on the event type.

Moreover, the first node modifies a probe list based on said at least one policy with respect to the second node. The probe list indicates an order in which nodes, neighbouring to the first node, are to be probed by transmission of the probe messages thereto. The second node is one of the nodes neighbouring to the first node. The first node further transmits the probe messages according to the probe list.

According to another aspect, the object is achieved by a first node configured for managing transmission of at least one probe message for detection of failure of a second node. A network comprises the first and second nodes. The first node is configured for receiving a message about an event related to the second node. The message comprises an identifier of the second node and an event type of the event. The first node is configured for retrieving at least one policy for failure detection based on the event type.

Furthermore, the first node is configured for modifying a probe list based on said at least one policy with respect to the second node. The probe list indicates an order in which nodes, neighbouring to the first node, are to be probed by transmission of the probe messages thereto. The second node is one of the nodes neighbouring to the first node. The first node is configured for transmitting the probe messages according to the probe list.

According to further aspects, the object is achieved by a computer program and a computer program carrier corresponding to the aspects above.

Thanks to that the first node modifies the probe list based on said at least one policy with respect to the second node, failure detections parameters are adjusted for an individual node, such as the second nodes, in response to events in the network.

The failure detections parameters may refer to frequency of transmission of probe messages towards such individual node, type of probe message to be transmitted towards said individual node, order of nodes in probe list or the like.

The event, given by the message, may typically be generated by components of the network. These components may handle resource scheduling, membership management or the like as may be appropriate in the network, such as a computer network providing shared resources, a distributed hardware network or system, a cloud center or the like. The event may thus indicate a status of a certain node, e.g. a change of role—from master to slave or vice versa, suspected malfunction or the like. Suspected malfunction may be caused by a lost message or the like.

The event type of the event, given by the message, is associated with one or more policies. A set of rules may manage conversion of event types to policies. The set of rules may be stored in a so called rules repository.

Accordingly, the first node is able to modify the probe list based on one or more dynamic events occurring in the network in order to e.g. adapt average time of detection of the failure of the second node. As a first example, the average time may be shortened for a certain node associated with a first event indicating packet loss by allowing this certain node to be placed closer to a beginning of the probe list than a position of the certain node before reception of the message about the first event. As a second example, the average time may be allowed to be longer for a specific node associated with a second event indicating a change of role from master to slave by allowing a probing frequency for the specific node to be decreased.

In this manner, increased flexibility relating to modification of the probe list may be achieved.

An advantage is that the probe list is modified with respect to the individual nodes, such as the second node. As a result, probing in general is not affected. Probing in general may refer to global probing settings, such as the predefined and fixed time interval mentioned in the background section in relation to the known SWIM system.

Efficiency of probing may thus be improved thanks to that resources for probing are consumed by the nodes of the probe list on an individual basis rather by a group of nodes, as given by the probe list, on a collective basis, or aggregated basis. Resources for probing may refer to number of probe messages, types of probe messages, consumption of time intervals available for transmission of probe messages and the like.

BRIEF DESCRIPTION OF THE DRAWINGS

The various aspects of embodiments disclosed herein, including particular features and advantages thereof, will be readily understood from the following detailed description and the accompanying drawings, which are described briefly in the following.

DETAILED DESCRIPTION

In order to better appreciated the embodiments herein, further description and analysis of prior art is provided in the following.

According to prior art, a polling interval, or probing interval, is pre-defined and fixed and applies to all neighbors of a probing node, i.e. a node that transmits probe messages. Therefore, the present inventors have realized that the probing interval is not flexible. The probing interval typically has a substantial impact on time before a failure is detected. A shorter probing interval makes detection of a failed node faster, but at the same time overhead, due to transmission of probe messages in the network, is increased. Therefore, it is often desired to balance detection speed and caused overhead by setting a suitable probing interval.

Existing systems attempt to consider these factors and set an appropriate probing interval for all nodes to be monitored in a network. However, conditions in the network are highly dynamic, both over time and for different nodes in the network. For example, some nodes, e.g. a so caller leader node of a group, may have a more important role, and it might therefore be beneficial with a shorter detection interval for such node. At the same time, another node may only perform some optional functionality, which may be dispensed with when resources are scarce. For this node, a longer detection interval would be sufficient for the benefit of less overhead. As a consequence, the fixed probing interval cannot be well suited for all conditions and all nodes at the same time.

Furthermore, in view of aforementioned U.S. Pat. No. 7,165,192 and the considerations above, the solution presented therein fails to address the issue related to balance between detection time and overhead. Instead, said U.S. Pat. No. 7,165,192 deals with fault isolation and root cause determination.

Throughout the following description, similar reference numerals have been used to denote similar features, such as nodes, actions, modules, circuits, parts, items, elements, units or the like, when applicable. In the Figures, features that appear in some embodiments are indicated by dashed lines.

Figure 1:
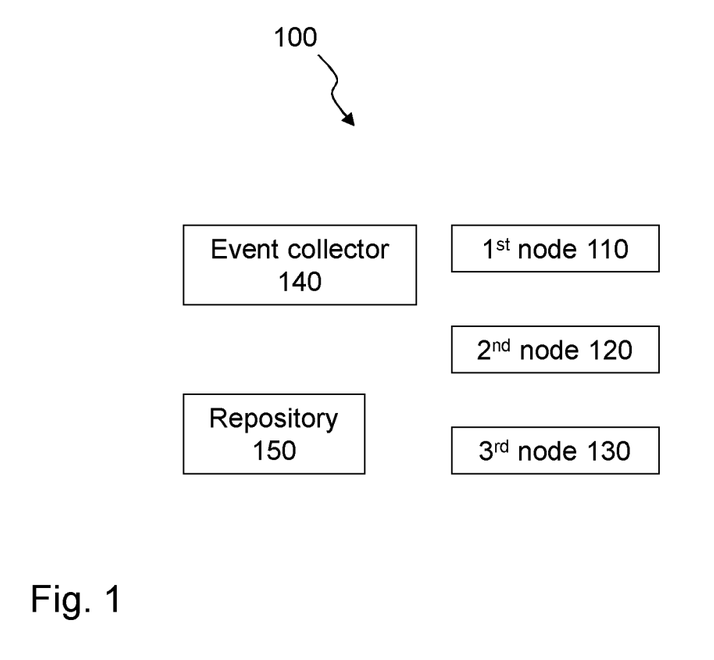
FIG. 1 is a schematic overview of an exemplifying system in which embodiments herein may be implemented.

FIG. 1 depicts an exemplifying network 100 in which embodiments herein may be implemented. In this example, the network 100 may be a cloud infrastructure. In other examples, the network 100 may be data center, a computer network, a cloud network, a cloud platform, a communication network or the like. The network 100 may be a portion, such as an underlying infrastructure, of any known communication system, such as any Third Generation Partnership Project (3GPP) network or the like, The network 100 comprises a first node 110, a second node 120 and a third node 130. As used herein, the term "node" may refer to a physical, logical or virtual entity of the network 100. Physical entity may refer to a set of hardware resources, such as memory, processor, network interfaces and the like, which may be located within a single casing. Logical or virtual entity may refer to a container in a cloud platform, a virtual machine, an execution environment, an application, a service or the like. Virtual machine may be formed by a collection of hardware resource residing in different casings, racks, sleds, blades or the like, of a so called disaggregated hardware system.

Each node, such as the first and second nodes 110, 120, of the network 100, may manage a probe list. Each node is responsible for maintaining the probe list and for sending of probe message to the nodes of the probe list. The probe list indicates an order and/or a frequency of probing for each node in the probe list. The probe list may include identities of nodes to be probed, where e.g. nodes at the beginning of the probe list are probed first.

Furthermore, one or more other components for management of the network 100 may also execute in at least some nodes of the network 100. The component(s) may handle resource scheduling, member management or the like.

The network 100 may further be said to comprise an event collector 140. The event collector 140 receives one or more events generated by the other components or one or more of the nodes 110, 120, 130 and forwards said one or more events to the nodes 110, 120, 130.

The event collector 140, or event collecting node, may be centralized and shared by all nodes in the network 100. Alternatively, the event collector 140 may be distributed and thus implemented in each node 110, 120, 130.

Moreover, FIG. 1 illustrates a repository 150 for storing rules mapping event types to policies. The rules may be pre-defined or dynamically configurable. The repository 150 may be centralized or distributed in each node of the network 100.

The rules may map two different event types to one and the same policy(ies). The rules may typically map two different event types to different policies, but in view of the foregoing, this is not required.

The policies may refer to failure detections parameters. As mentioned, the failure detection parameters may refer to frequency of transmission of probe messages, type of probe message to be transmitted, order of nodes in probe list, measure(s) to execute or the like. In this contest, measure(s) to execute may refer to double or half probing interval for a node under consideration, probe now towards the node under consideration etc.

As an example, a rule stored in the repository 150 may indicate:
an identifier for the rule, such as RuleID,
a type of an event for which the rule shall be applied, such as EventType,
one or more policies, and the like.

In more detail, two exemplifying rules may be: (Rule1, ChangedRoleToLeader, HalfInterval) and (Rule2, NoReply, CheckNow).

Figure 2:
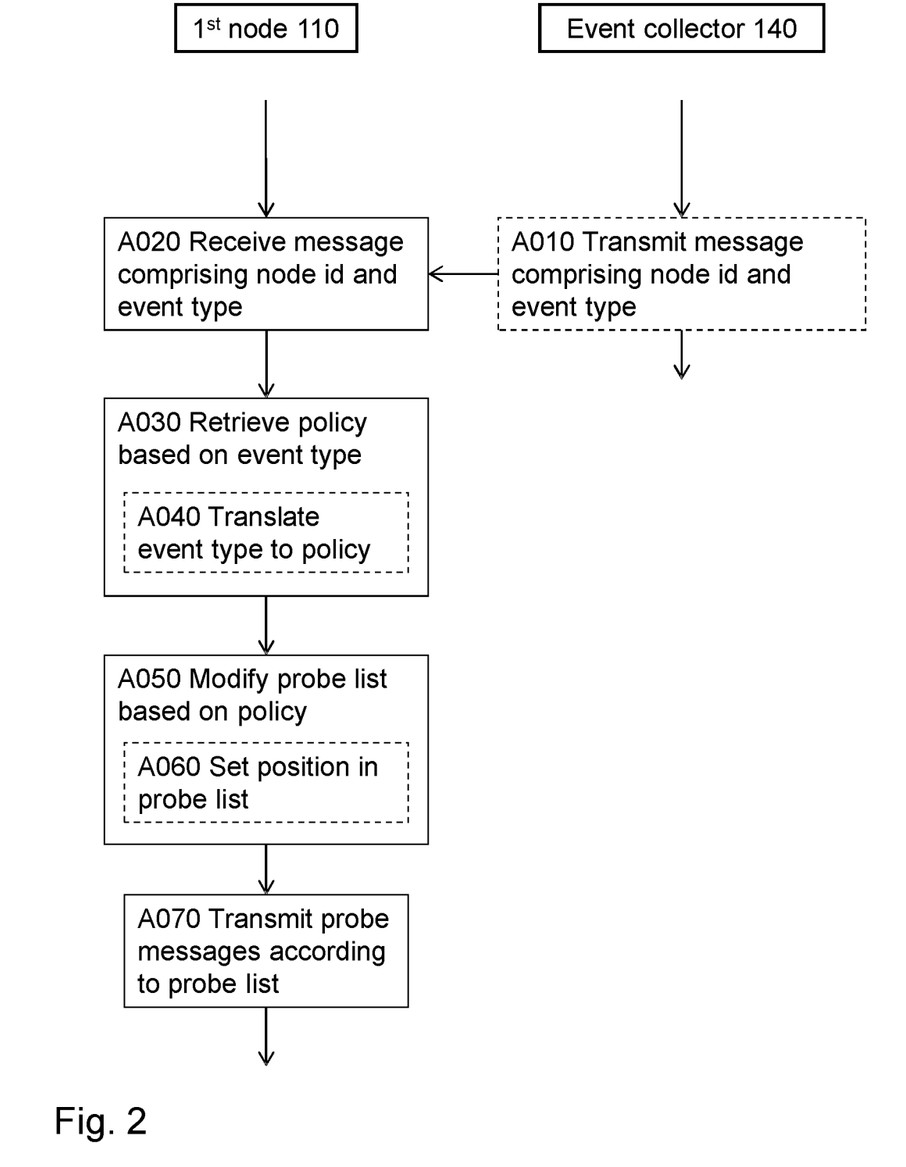
FIG. 2 is a combined signaling and flowchart illustrating the methods herein.

FIG. 2 illustrates an exemplifying method according to embodiments herein when implemented in the network 100 of FIG. 1. The first node 110 performs a method for managing transmission of at least one probe message for detection of failure of the second node 120.

One or more of the following actions may be performed in any suitable order.
Action A010

The event collector 140 may receive (not shown) from aforementioned other component one or more messages indicating status change observed by the component regarding e.g. any one or more of nodes 110, 120, 130. The status change may indicate a change of role, e.g. from slave to master or vice versa, a loss of packet(s), a delay of packet(s) or the like. The event collector 140 may receive this kind of message from many different components. In this manner, the event collector 140 collects these messages.

When a certain number of messages has been collected, when a certain time has lapsed since last transmission of a message about an event to the first node or other suitable criterion, the event collector 140 may send a message about an event related to the second node 120, i.e. a new message unless this is the first time the event collector 140 sends this kind of message to the first node 110.

The event collector 140 may thus have the task of collecting and forwarding information about events. This information about events is typically be received from aforementioned other components, but the information may also, or alternatively, be received from a peer node, such as the third node 130.

A known so called publish-subscribe technology may be used, whereby the event collector 140 only sends the message about the event to those nodes of the network 110 that has subscribed to these messages about events.

As an example, the message about the event may comprise one or more:
an identifier of a causing node causing the event reported to the event collector 140,
an event type of the event,
a time stamp,
an identifier of a source node, i.e. the node that reported the event to the event collector 140, and
the like.

Typically, the message comprises at least the event type of the event and the identifier of the causing node.

The event type may relate to one or more of: loss of message, change of criticality level of the second node 120 and the like.

The loss of message may refer to that the source node did not receive a response, e.g. in time, from the causing node or an unknown node.

The change of criticality level of the second node 120 may be expressed as change of criticality level of the node causing the event. The change of criticality level may refer to change of role, change of task or the like. For example, change of task for a node from handling optional functions to handling essential functions, typically implies an increase of the criticality level. An increase of the criticality level would normally mean that a shortened maximum failure detection time is desired. In case of a video stream service, optional functions may be 'repeat on demand' or 'selection of camera angles', whereas 'providing a minimum resolution video stream' may be considered to be an essential function. The criticality level may be said to be a measure of how important a certain node shall be considered to be, e.g. in relation to other nodes, in absolute terms, how fast it is required that any failure of this node is detected, etc.

Sometimes the identifier of the causing node may be equal to the identifier of the sources node. This may for example happen when a node reports that it changes role, e.g. from leader to minion, but it may not happen when the causing node does not respond the node not responding can typically not report that it did not respond.

In more detail, two exemplifying message about events may be: (ChangedRoleToLeader, Node3, MembershipManagementID1, 201905141230) and (NoReply, Node4, ResourceSchedulerID2, 202002051240).
Action A020

Subsequent to action A010, the first node 110 receives, e.g. from the event collector 140, the message about the event related to the second node 120. The message comprises an identifier of the second node 120 and the event type of the event. This means that the identifier of the causing node is the identifier of the second node 120. In turn, this means that the event related to the second node 120 may refer to that the second node 120 caused the event, or potentially caused the event.

In some examples, the first node 110 may parse the message about the event in order to obtain the identifier of the node causing the event. The first node 110 may then check its probe list in order to find out whether or not the node causing the event affects any one of the nodes in the probe list. For example, if the identifier of the node causing the event is found in the probe list, then that node is affected.

If no node is found to be affected by the event, the first node 110 may skip this message about the event.

Action A030

The first node 110 retrieves, e.g. from the repository 150, at least one policy for failure detection based on the event type. As an example, the repository 150 may, in response to a request indicating a given event type, respond with said at least one policy. In this manner, the first node 110 translates the event type to said at least one policy.

Each policy of said at least one policy may comprise one or more of:
an indication about probing order,
a parameter relating to probing frequency,
a type of probe message to be used,
a parameter relating to layer of probe message(s),
a time stamp, and the like.

The indication about probing order may increase priority for probing towards the node causing the event such that the node causing the event will be probed sooner rather than later. In this case, it may be that the first node 110 probes in order of descending priority, i.e. higher priorities are probed before lower priorities.

The indication about probing order may allow the node causing the event, or rather the identity thereof, to be moved closer to the beginning of the probe list, e.g. in relative or absolute terms.

The parameter relating to probing frequency may refer to an individual probing frequency for the node causing the event. That is to say, the parameter relating to probing frequency is not related to the probing interval applicable to all nodes as in prior art.

The type of probe message may indicate in-direct probe message, direct probe message or the like.

The parameter relating to layer of the probe message(s) may indicate a layer of the probe message(s), i.e. in which layer the probe message(s) is sent. Examples of layers are IP layer, User Datagram Protocol (UDP) layer, link layer or the like.

The time stamp may refer to when the policy was created, such as stored in the repository 150. In this manner, the first node 110 may distinguish old policies from new ones and thus allow new policies to override old policies.

Action A040

The event type may be associated with a first layer and the policy may be associated with a second layer. As an example, the event type may specify events that may occur in the first layer, i.e. events that are capable of occurring, and the policy may be applicable to the second layer, i.e. the policy is defined and known in the second layer. The first layer may different from the second layer. However, the first layer may also be the same as the second layer in which case the repository may be omitted, at least if the first and second layers then both include information about events and their mapping to one or more policies. Typically, the first layer may overlay the second layer. This means that the first layer is a higher layer as compared to the second layer.

In this context, it may be that the rules map the event type of the first layer to said at least one policy of the second layer.

Accordingly, the first node 110 may translate the event type of the first layer to said at least one policy of the second layer based on rules. Expressed differently, the retrieving A030 of said at least one policy may comprise translation of the event type to said at least one policy of the second layer based on the rules.

Action A050

Subsequent to that a policy has been retrieved for the event type of the message, the first node 110 modifies the probe list based on said at least one policy with respect to the second node 120. The second node 120 is one of the nodes neighbouring to the first node 110.

The probe list indicates an order in which nodes, neighbouring to the first node 110, are to be probed by transmission of the probe messages thereto. In some examples, the probe list may further associate each node of the probe list with a type of probe message for use when transmitting one or more probe messages towards said each node. In this manner, transmission of probe messages is managed by the first node 110 according to the probe list.

Some illustrative examples are given in the following.

In one example, the modification of the probe list based on said at least one policy with respect to the second node 120 may mean that the first node 110 puts the identity of the second node 120 at the beginning, or even first, in the probe list in case the first node 110 found, in e.g. action A030, that the policy is "CheckNow".

In another example, the policy may be "HalfInterval". Then, the first node 110 may modify the probe list by placing two instances of the identity of the second node 120 in the probe list, preferably the two instances are evenly spread in the probe list.

In a yet further example, the policy may be "UseIndirectProbeMsg". Then, the first node 110 may associate the identity of the second node 120 with a type of probe message, i.e. in-direct probe message. Thus, the probe list is modified in terms of type of probe message associated with the second node 120.

In a still further example, the policy may be "ChangeProbingToHigherLayer". Then, the first node 110 may modify the probe list by specifying in which layer the probe message(s) shall be sent.

Further examples may be contemplated. Generally, the examples would be dependent on a failure detection mechanism used, e.g. as reported by the event collector. Various policies may then be created to modify parameters which are related to the failure detection mechanism used.

Thanks to that the first node 110 modifies the probe list, i.e. the one and only existing probe list, memory and/or processing resource may be used efficiently. Moreover, the first node 110 avoids duplication of the probe list, or at least some entries therein, thereby avoiding complex and error-prone synchronization which may be caused by maintenance of several probe lists.

Action A060

The first node 110 may set a position of the second node 120 in the probe list based on said at least one policy, thereby modifying the probe list in terms of frequency and/or order with respect to the second node 120. Expressed differently, the modification A050 of the probe list comprises setting the position of the second node 120 in the probe list based on said at least one policy.

By means of the embodiments herein more efficient probing may thus be achieved e.g. thanks to that probing frequency may be adjusted for an individual node, rather than for a failure detection system, i.e. all nodes probed by the failure detection system. As an example, frequency of probe messages thus may be increased for a certain node without less increase of overhead as compared to when frequency of probe messages for an entire failure detection system is increased.

According to action A050 and/or A060, the probe list is thus updated individually for a particular node, such as the second node 120, associated with the event.

Action A070

The first node 110 transmits said at least one probe messages according to the probe list, i.e. the modified probe list.

In view of the above, an improved distributed failure detection system, e.g. in terms of flexibility in selection of failure detection parameters, may be achieved.

The method above has been described as being performed by the first node 110. It is evident that the method may be described as being performed by the second or third node 120, 130. Furthermore, the method above may be described as being performed by a failure detecting unit, being comprised in any one of the first, second and third nodes 110, 120, 130.

Figure 3:
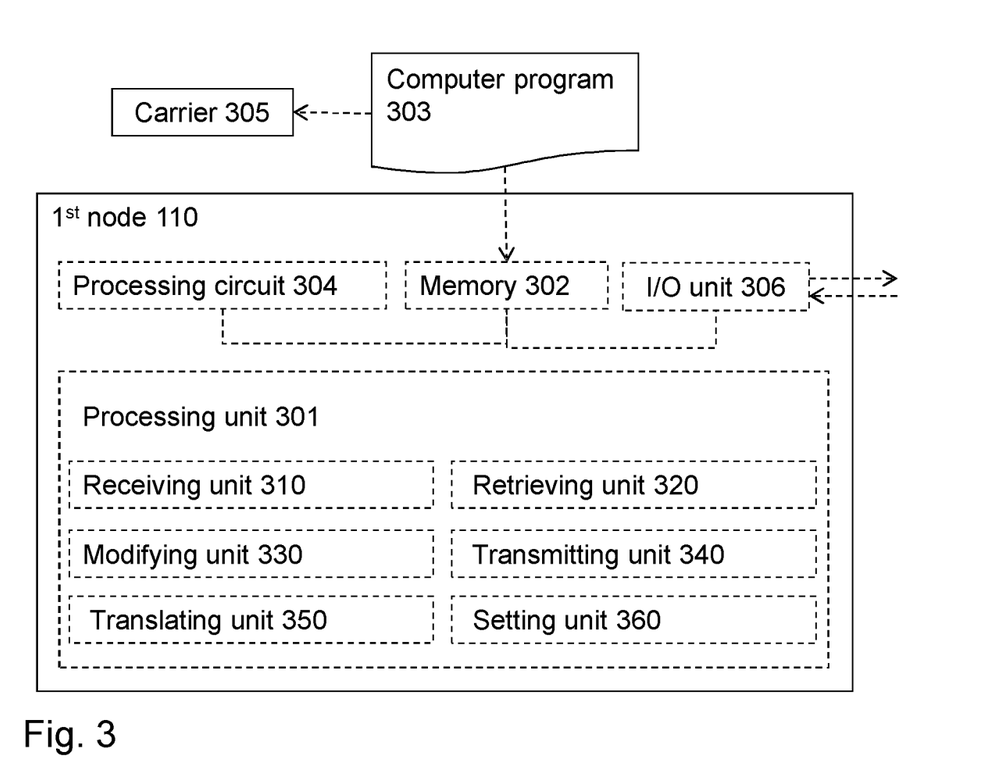
FIG. 3 is a block diagram illustrating embodiments of the first node.

With reference to FIG. 3, a schematic block diagram of embodiments of the first node 110 of FIG. 1 is shown.

The first node 110 may comprise a processing unit 301, such as a means for performing the methods described herein. The means may be embodied in the form of one or more hardware units and/or one or more software units. The term "unit" may thus refer to a circuit, a software block or the like according to various embodiments as described below.

The first node 110 may further comprise a memory 302. The memory may comprise, such as contain or store, instructions, e.g. in the form of a computer program 303, which may comprise computer readable code units.

According to some embodiments herein, the first node 110 and/or the processing unit 301 comprises a processing circuit 304 as an exemplifying hardware unit, which may comprise one or more processors. Accordingly, the processing unit 301 may be embodied in the form of, or 'realized by', the processing circuit 304. The instructions may be executable by the processing circuit 304, whereby the first node 110 is operative to perform the methods of FIG. 2. As another example, the instructions, when executed by the first node 110 and/or the processing circuit 304, may cause the first node 110 to perform the method according to FIG. 2.

In view of the above, in one example, there is provided a first node 110 for managing transmission of at least one probe message for detection of failure of a second node 120. As mentioned, the network 100 comprises the first and second nodes 110, 120. Again, the memory 302 contains the instructions executable by said processing circuit 304 whereby the first node 110 is operative for:

receiving a message about an event related to the second node 120, wherein the message comprises an identifier of the second node 120 and an event type of the event, retrieving at least one policy for failure detection based on the event type, and modifying a probe list based on said at least one policy with respect to the second node 120, wherein the probe list indicates an order in which nodes, neighbouring to the first node 110, are to be probed by transmission of the probe messages thereto, wherein the second node 120 is one of the nodes neighbouring to the first node 110, and transmitting the probe messages according to the probe list.

FIG. 3 further illustrates a carrier 305, or program carrier, which provides, such as comprises, mediates, supplies and the like, the computer program 303 as described directly above. The carrier 305 may be one of an electronic signal, an optical signal, a radio signal and a computer readable medium.

In some embodiments, the first node 110 and/or the processing unit 301 may comprise one or more of a receiving unit 310, a retrieving unit 320, a modifying unit 330, a transmitting unit 340, a translating unit 350, and a setting unit 360 as exemplifying hardware units. The term "unit" may refer to a circuit when the term "unit" refers to a hardware unit. In other examples, one or more of the aforementioned exemplifying hardware units may be implemented as one or more software units.

Moreover, the first node 110 and/or the processing unit 301 may comprise an Input/Output unit 306, which may be exemplified by the receiving unit and/or the transmitting unit when applicable.

Accordingly, the first node 110 configured for managing transmission of at least one probe message for detection of failure of a second node 120. As mentioned, the network 100 comprises the first and second nodes 110, 120.

Therefore, according to the various embodiments described above, the first node 110 and/or the processing unit 301 and/or the receiving unit 310 is configured for receiving a message about an event related to the second node 120. The message comprises an identifier of the second node 120 and an event type of the event.

The first node 110 and/or the processing unit 301 and/or the retrieving unit 320 is configured for retrieving at least one policy for failure detection based on the event type.

The first node 110 and/or the processing unit 301 and/or the modifying unit 330 is configured for modifying a probe list based on said at least one policy with respect to the second node 120. The probe list indicates an order in which nodes, neighbouring to the first node 110, are to be probed by transmission of the probe messages thereto. The second node 120 is one of the nodes neighbouring to the first node 110.

The first node 110 and/or the processing unit 301 and/or the transmitting unit 340 is configured for transmitting the probe messages according to the probe list.

The event type may relate to one or more of: loss of message, change of criticality level of the second node 120 and the like.

In some embodiments, the event type may be associated with a first layer and the policy may be associated with a second layer. The first layer may be different from the second layer. The first node 110 and/or the processing unit 301 and/or the retrieving unit 320 may be configured for retrieving said at least one policy by translating, e.g. by means of a translating unit 350, the event type of the first layer to said at least one policy of the second layer based on rules. The rules may map the event type of the first layer to said at least one policy of the second layer.

Each policy of said at least one policy may comprise one or more of: an indication about probing order, a parameter relating to probing frequency, a type of probe message, a time stamp, and the like.

The first node 110 and/or the processing unit 301 and/or modifying unit 330 may be configured for modifying the probe list by setting, e.g. by means of the setting unit 360, a position of the second node 120 in the probe list based on said at least one policy. In this manner, the probe list is modified in terms of frequency and/or order with respect to the second node 120.

As used herein, the term "node" may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines. In case of a cloud system, the term "node" may refer to a virtual machine, such as a container, virtual runtime environment or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a Dynamic Link Library (DLL), a software component, a software object, an object according to Component Object Model (COM), a software function, a software engine, an executable binary software file or the like.

The terms "processing unit" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a first node, for managing transmission of at least one probe message for detection of failure of a second node, wherein a network comprises the first and second nodes, the method comprises:

receiving a message about an event caused by the second node, wherein the message comprises an identifier of the second node causing the event and an event type of the event caused by the second node, retrieving at least one policy for failure detection based on the event type, modifying a probe list based on said at least one policy by placing an instance of the identifier of the second node in a position within the probe list, which is different from a position of an instance of the identifier of the second node in the probe list before reception of the message about the event, wherein the probe list indicates an order and a frequency of probing, which are changed based on positions of instances of identifiers of nodes within the probe list, the nodes, neighbouring to the first node, are to be probed by transmission of the probe messages in accordance with the positions of the instances of the identifiers of the nodes in the probe list, the second node is one of the nodes neighbouring to the first node, and transmitting the probe messages according to the positions of the instances of the identifiers of the nodes in the probe list.

2. The method according to claim 1, wherein the event type relates to one or more of: loss of message, and change of criticality level of the second node.

3. The method according to claim 1, wherein the event type is associated with a first layer and the policy is associated with a second layer, wherein the first layer is different from the second layer, wherein the retrieving of said at least one policy comprises:

translating the event type of the first layer to said at least one policy of the second layer based on rules, wherein the rules map the event type of the first layer to said at least one policy of the second layer.

4. The method according to claim 1, wherein each policy of said at least one policy comprises one or more of:
an indication about probing order,
a parameter relating to the frequency of probing,
a type of probe message, and
a time stamp.

5. The method according to claim 1, wherein the modifying of the probe list comprises:

setting a position of the second node in the probe list based on said at least one policy, thereby modifying the probe list in terms of the frequency and the order with respect to the second node.

6. A first node configured for managing transmission of at least one probe message for detection of failure of a second node, wherein a network comprises the first and second nodes, the first node comprises:

a processing circuit; and a memory, wherein the processing circuit comprises instructions executable by the processing circuit whereby the first node is operable to:

receive a message about an event caused by the second node, wherein the message comprises an identifier of the second node causing the event and an event type of the event caused by the second node, retrieve at least one policy for failure detection based on the event type, modify a probe list based on said at least one policy by placing an instance of the identifier of the second node in a position within the probe list, which is different from a position of an instance of the identifier of the second node in the probe list before reception of the message about the event, wherein the probe list indicates an order and a frequency of probing, which are changed based on positions of instances of identifiers of nodes within the probe list, the nodes, neighbouring to the first node, are to be probed by transmission of the probe messages in accordance with positions of the instances of the identifiers of the nodes in the probe list, the second node is one of the nodes neighbouring to the first node, and transmit the probe messages according to the positions of the instances of the identifiers of the nodes in the probe list.

7. The first node according to claim 6, wherein the event type relates to one or more of: loss of message, and change of criticality level of the second node.

8. The first node according to claim 6, wherein the event type is associated with a first layer and the policy is associated with a second layer, wherein the first layer is different from the second layer, wherein the first node is configured for retrieving said at least one policy by translating the event type of the first layer to said at least one policy of the second layer based on rules, wherein the rules map the event type of the first layer to said at least one policy of the second layer.

9. The first node according to claim 6, wherein each policy of said at least one policy comprises one or more of:
an indication about probing order,
a parameter relating to the frequency of probing,
a type of probe message, and
a time stamp.

10. The first node according to claim 6, wherein the first node is configured for modifying the probe list by setting a position of the second node in the probe list based on said at least one policy, thereby modifying the probe list in terms of the order and the frequency of probing with respect to the second node.

11. A non-transitory computer-readable medium with instructions stored thereon which, when executed on a first node for managing transmission of at least one probe message for detection of failure of a second node, cause the first node to:

receive a message about an event caused by the second node, wherein the message comprises an identifier of the second node causing the event and an event type of the event caused by the second node, retrieve at least one policy for failure detection based on the event type, modify a probe list based on said at least one policy by placing an instance of the identifier of the second node in a position within the probe list, which is different from a position of an instance of the identifier of the second node in the probe list before reception of the message about the event, wherein the probe list indicates an order and a frequency of probing, which are changed based on positions of instances of identifiers of nodes within the probe list, the nodes, neighbouring to the first node, are to be probed by transmission of the probe messages in accordance with the positions of the instances of the identifiers of the nodes in the probe list, the second node is one of the nodes neighbouring to the first node, and transmit the probe messages according to the positions of the instances of identifiers of the nodes in the probe list.

* * * * *